United States Patent
Levine

(10) Patent No.: US 12,367,563 B2
(45) Date of Patent: Jul. 22, 2025

(54) TOMOGRAPHIC RECONSTRUCTION APPARATUS AND REMOVING DIFFRACTION EFFECTS IN A TOMOGRAPHIC IMAGE

(71) Applicant: Government of the United States of America, as represented by the Secretary of Commerce, Gaithersburg, MD (US)

(72) Inventor: Zachary Howard Levine, Rockville, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 503 days.

(21) Appl. No.: 17/700,884

(22) Filed: Mar. 22, 2022

(65) Prior Publication Data

US 2022/0309626 A1    Sep. 29, 2022

Related U.S. Application Data

(60) Provisional application No. 63/165,922, filed on Mar. 25, 2021.

(51) Int. Cl.
  *G06T 5/80*    (2024.01)
  *G06T 1/00*    (2006.01)
(52) U.S. Cl.
  CPC .............. *G06T 5/80* (2024.01); *G06T 1/0007* (2013.01); *G06T 2207/10072* (2013.01)
(58) Field of Classification Search
  CPC ........... G06T 5/80; G06T 1/00; G06T 1/0007; G06T 2207/10072; G06T 2211/424; G06T 11/00; G06T 11/006
  See application file for complete search history.

(56) References Cited

U.S. PATENT DOCUMENTS

| | | | | |
|---|---|---|---|---|
| 6,356,349 B1 * | 3/2002 | Koehl | ............. | G01N 21/1717 356/432 |
| 8,558,998 B2 * | 10/2013 | Feldkhun | ............ | G01N 21/6458 382/206 |

(Continued)

FOREIGN PATENT DOCUMENTS

| | | | | |
|---|---|---|---|---|
| JP | 5936200 B2 * | 6/2016 | ............. | A61B 6/027 |
| WO | WO-2012050901 A2 * | 4/2012 | ......... | G01N 21/4795 |

OTHER PUBLICATIONS

Paganin, David M., and Daniele Pelliccia. "Tutorials on X-ray phase contrast imaging: Some fundamentals and some conjectures on future developments." arXiv preprint arXiv:1902.00364 (2019). (Year: 2019).*

(Continued)

*Primary Examiner* — Stephen R Koziol
*Assistant Examiner* — Benedict E Lee
(74) *Attorney, Agent, or Firm* — Office of Chief Counsel for National Institute of Standards and Technology

(57) ABSTRACT

Removing diffraction effects in a tomographic image includes: obtaining an empirical image of a sample; producing an initial wave at a radiation source; forward propagating the initial wave from the radiation source toward a detector; receiving by a sample the initial wave; forward propagating the initial wave through the sample and accumulating phase and amplitude information to produce a phase accumulated wave; back propagating the phase accumulated wave; and forward propagating the phase accumulated wave 208 while treating Fresnel diffraction, such that the empirical image is reconstructed by projections and diffraction via maximum likelihood, a Bayesian prior probability distribution, and a Fresnel propagator.

16 Claims, 10 Drawing Sheets
(3 of 10 Drawing Sheet(s) Filed in Color)

(56) References Cited

U.S. PATENT DOCUMENTS

| | | | | |
|---|---|---|---|---|
| 9,116,120 | B2* | 8/2015 | Rodenburg | G01N 21/4788 |
| 11,892,769 | B2* | 2/2024 | Mout | G01B 11/24 |
| 11,940,611 | B2* | 3/2024 | Jia | G02B 21/08 |
| 11,988,603 | B2* | 5/2024 | Vaziri | G02B 21/0076 |
| 2011/0235862 | A1* | 9/2011 | Roberts | A61B 6/52 382/103 |
| 2014/0043616 | A1* | 2/2014 | Maiden | G01N 21/05 356/446 |
| 2016/0063694 | A1* | 3/2016 | Shi | G06V 10/143 382/131 |
| 2020/0142356 | A1* | 5/2020 | Gilles | G03H 1/0808 |

OTHER PUBLICATIONS

Levine, Zachary H., et al. "X-ray computed tomography using partially coherent Fresnel diffraction with application to an optical fiber." Optics Express 29.2 (2021): 1788-1804. (Year: 2021).*

Chang, Won-Seok, et al. "Wave propagation simulation based on the Fourier diffraction integral for X-ray refraction contrast imaging-computed tomography." Journal of the Korean Physical Society 69 (2016): 1098-1104. (Year: 2016).*

Paganin, David M., and Daniele Pelliccia. "Tutorials on X-ray phase contrast imaging: Some fundamentals and some conjectures on future developments." arXiv preprint arXiv:1902.00364 (Year: 2019).*

Bouman, C., et al., "A Generalized Gaussian Image Model for Edge-Preserving MAP Estimation", IEEE Transactions on Image Processing, 1993, p. 296-310, vol. 2 No. 3.

Weitkamp, T., et al., "ANKAphase: software for single-distance phase retrieval from inline X-ray phase-contrast radiographs", Journal of Synchrotron Radiation, 2011, p. 617-629, vol. 18.

Levine, Z.L., et al., "X-ray computed tomography using partially coherent Fresnel diffraction with application to an optical fiber", Optics Express, 2021, p. 1788-1804, vol. 29 No.2.

Pfeiffer, F., "X-ray ptychography", Nature Photonics, 2018, p. 9-17, vol. 12.

Hehn, L., et al., "Nonlinear statistical iterative reconstruction for propagation-based phase-contrast tomography", APL Bioengineering, 2018, p. 016105, vol. 2.

Kalasova, D., et al., "Characterization of a Laboratory-Based X-Ray Computed Nanotomography System for Propagation-Based Method of Phase Contrast Imaging", IEEE Transactions on Instrumentation and Measurement, 2020, p. 1170-1178, vol. 69 No.4.

Häggmark. I., et al., "Comparison of quantitative multi-material phaseretrieval algorithms in propagation-based phase-contrast X-ray tomography", Optics Express, 2017, p. 33543-33558, vol. 25 No. 26.

Myers, G.R., et al., "Polychromatic cone-beam phase-contrast tomography", Physical Review A, 2007, p. 045804, vol. 76.

* cited by examiner

Table 1. Computer time per iteration for the four methods for the problem described in the text running on an 8 processor computer with a clock speed of 3.7 GHz. The number of iterations is given at right. The program was written in Fortran 90 with MPI.

|  | Time Per Iteration | | Number of Iterations | |
| --- | --- | --- | --- | --- |
|  | Projective | Fresnel | Projective | Fresnel |
| Maximum Likelihood | 144 s | 460 s | 144 | 465 |
| Bayesian | 154 s | 491 s | 56 | 194 |

FIG. 10

TOMOGRAPHIC RECONSTRUCTION APPARATUS AND REMOVING DIFFRACTION EFFECTS IN A TOMOGRAPHIC IMAGE

CROSS REFERENCE TO RELATED APPLICATIONS

This application claims the benefit of U.S. Provisional Patent Application Ser. No. 63/165,922 (filed Mar. 25, 2021), which is herein incorporated by reference in its entirety.

BRIEF DESCRIPTION

Disclosed is a process for removing diffraction effects in a tomographic image, the process comprising: obtaining an empirical image of a sample, the empirical image comprising diffraction effects; producing an initial wave at a radiation source; forward propagating, in a forward propagation direction from the radiation source toward a detector; receiving, at a radiation source proximate surface of the sample that is interposed between the radiation source and the detector, the initial wave from the radiation source; forward propagating, in the forward propagation direction, the initial wave through the sample and accumulating phase and amplitude information of the initial wave as the initial wave propagates through the sample toward the detector to produce a phase accumulated wave at a detector proximate surface of the sample according to $$U(X,Y,Z_f) \approx \exp\{ikZ_f - k\int_{Z_i}^{Z_f} dZ[i\delta_E(X,Y,Z) + \beta_E(X,Y,Z)]\} U(X,Y,Z_i);$$

back propagating, in a reverse propagation direction in absence of the sample, the phase accumulated wave from the detector proximate surface to the radiation source; and forward propagating, in the forward propagation direction from the radiation source toward the detector in absence of the sample, the phase accumulated wave while treating Fresnel diffraction according to $$U(X_b, Y_b, Z_b) = \frac{e^{ikZ_{ba}}}{i\lambda Z_{ba}} \int dX_a dY_a \exp\left\{i\frac{k}{2Z_{ba}}[(X_b-X_a)^2 + (Y_b-Y_a)^2]\right\} \times U(X_a, Y_a, Z_a),$$

such that the empirical image of the sample is reconstructed by projections and diffraction via maximum likelihood, a Bayesian prior probability distribution, and a Fresnel propagator.

Disclosed is a process for removing diffraction effects in a tomographic image, the process comprising: determining $b(X_1, Y_1)$ from a plurality of projections and an estimate of the material parameters $\delta$ and $\beta$; applying the Fourier transform to $b(X_1, Y_1)$ to find $B(X_0, Y_0)$; determining $\tilde{U}(X_2,Y_2,Z_2)$ by multiplying $B(X_0, Y_0)$ by a quadratic phasor and prefactors and applying an inverse Fourier transform according to $$\tilde{U}(X_2, Y_2, Z_2) = \frac{1}{\lambda^3 Z_{10}^2 Z_{20}} \int\int dX_0 dY_0 \exp\left\{i\frac{k}{2}\left(\frac{1}{Z_{20}} - \frac{1}{Z_{10}}\right)(X_0^2 + Y_0^2)\right\} \times B(X_0, Y_0)$$

$$\exp\left\{-i\frac{k}{Z_{20}}(X_2 X_0 + Y_2 Y_0)\right\}$$

BRIEF DESCRIPTION OF THE DRAWINGS

The patent or application file contains at least one drawing executed in color. Copies of this patent or patent application publication with color drawings will be provided by the Office upon request and payment of the necessary fee.

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

FIG. 10 shows, according to the Example, computer time per iteration for the four methods for the problem described in the text running on an 8 processor computer with a clock speed of 3.7 GHz. The number of iterations is given at right. The program was written in Fortran 90 with the message passing interface (MPI).

DETAILED DESCRIPTION

Figure 1:
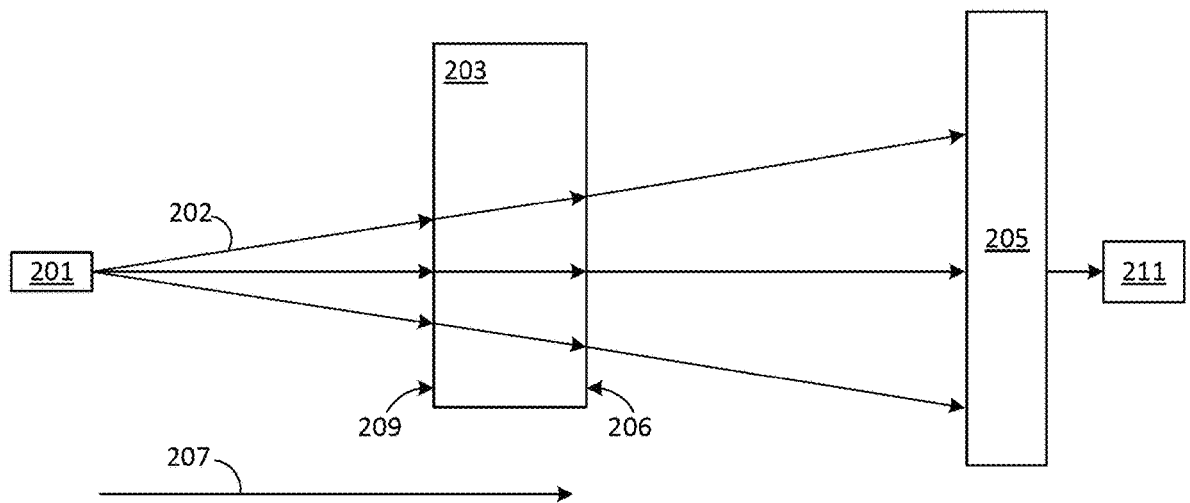
FIG. 1 shows a tomographic reconstruction apparatus, according to some embodiments.

A detailed description of one or more embodiments is presented herein by way of exemplification and not limitation.

The spatial resolution achieved by x-ray computed tomography has improved by overfive orders of magnitude from 2 mm in early medical imaging. Groups using synchrotron sources have pioneered the reduction of spatial resolution from the 15 µm resolution achieved in 1993 on rock samples to about 10 nm achieved in recent years using ptychography, a lensless technique which depends intimately on the analysis of diffraction patterns. Hard x-ray projective nanotomography at synchrotrons is also practiced. The capabilities of laboratory sources have also increased markedly, with widely available commercial instruments offering a resolution of 3 µm for large industrial parts and a few vendors offering resolutions below 100 nm for smaller samples.

A quarter century back, it was discovered that diffraction effects are also visible in x-ray images from tube sources despite their broad-band nature. Such sources are nearly universally used in laboratory-based x-ray tomography. Although diffraction effects in tomography are a well-researched field, geometrical projection remains the dominant paradigm. Typically, when the Fresnel number $F=a^2/(\Lambda z_{eff})$ is comparable to or less than 1, diffraction effects are significant. Here, a is the feature size, $\Lambda$ is the wavelength and $Z_{eff}$ is the effective distance given by $z_{eff}^{-1} = z_1^{-1} + z_2^{-1}$ where $z_1$ is the source-sample distance and $z_2$ is the sample-detector distance. In the case of parallel illumination, $Z_{eff}=z_2$. The rule for addition of inverse distances is at the heart of the thin lens law, and has been used for many years in x-ray phase-coherent imaging, including a beamline with variable magnification. As the feature size a decreases, the Fresnel number decreases. Additionally, less energetic x rays typically provide for efficient interactions for small samples, so, in practice, $\Lambda$ will tend to increase as a decreases, also leading to a smaller Fresnel number.

Because nanoscale resolution is increasingly common, it is timely to reconsider diffraction effects in tomography. The tomography of integrated circuit interconnects, for example, has grown from a synchrotron demonstration to vastly larger demonstrations using synchrotron sources and ptychography, developed in the two decades since diffraction patterns of non-periodic objects were first inverted from experimental data. Inverted refers to the real-space images of the samples generating the diffraction were found. The application of x-ray nanotomography and other imaging techniques to the problem of integrated circuit interconnects has been reviewed recently. In addition to x-ray tomography, Fresnel diffraction has been identified to be a problem in electron tomography of thick samples.

Alternative methods of phase retrieval for propagation-based imaging are also used. Recently, the conditions for propagation-based imaging in a laboratory x-ray nanotomography instrument were characterized. Similarly, there are recent studies which incorporate diffraction effects into a ray-tracing-based Monte Carlo simulation of x-ray images.

Aside from ptychography, which operates in the far field, one common approach to diffractionbased tomography is based on the Transport of Intensity Equation (TIE) and is known as Paganin's algorithm. This has been implemented in the open source code Ankaphase. Paganin's algorithm is based on applying a single step of Euler's method for solving differential equations to the TIE. Its validity requires $F \gg 1$ and a monochromatic source, which are far different from the conditions considered in this paper. The condition $F \gg 1$ is equivalent to requiring the propagation distance to be much less than the Rayleigh length in the case of Gaussian beams. Another technique used at synchrotrons is to acquire phase maps for each projection by imaging at several defocus distances, followed by tomographic reconstruction of the reconstructed phase. An initial report of a polystyrene sample reconstructed with 0.95 µm voxels found phase shifts in excess of $2\pi$.

Accordingly, there is a need to develop tomographic methods that are based on more robust assumptions for application to broadband tube sources in instruments with spatial resolution near or below 1 µm. To encourage practical use, these methods should not be much slower than existing projection-based methods, they should allow for a source spectrum in a principled way, and allow operation for intermediate Fresnel numbers, say $F=0.1$ to $F=1$, i.e., between the validity conditions for Paganin's algorithm and ptychography. The finite bandwidth of the source spectrum necessarily results in partial coherence of the beam. Partially coherent propagation has been considered in accelerator design over the last decade.

Some have observed diffraction effects in a tomographic reconstruction of a graded-index optical fiber. An earlier study observed similar features. In both studies, the diffracting regions were avoided in the analysis of the images.

It has been discovered that an algorithm for partially coherent x-ray computed tomography, including Fresnel diffraction reconstructs images of a sample with projections and diffraction, using maximum likelihood and a Bayesian process. The Fresnel propagator used herein goes beyond TIE and Paganin's algorithm. The inclusion of Fresnel diffraction removes reconstruction artifacts, and the use of the Bayesian prior probability distribution removes others.

Figure 2:
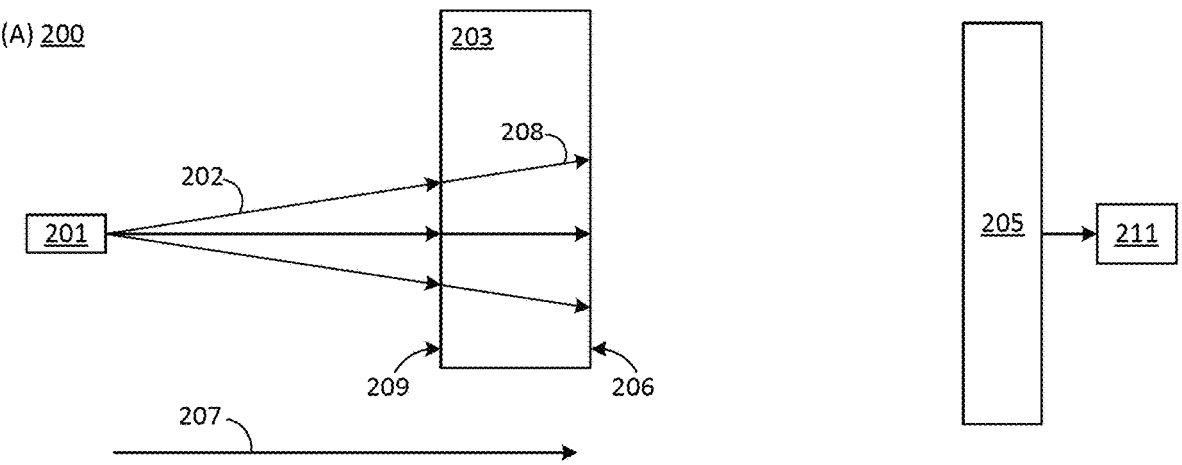
FIG. 2 shows a tomographic reconstruction apparatus, according to some embodiments.
Figure 2:
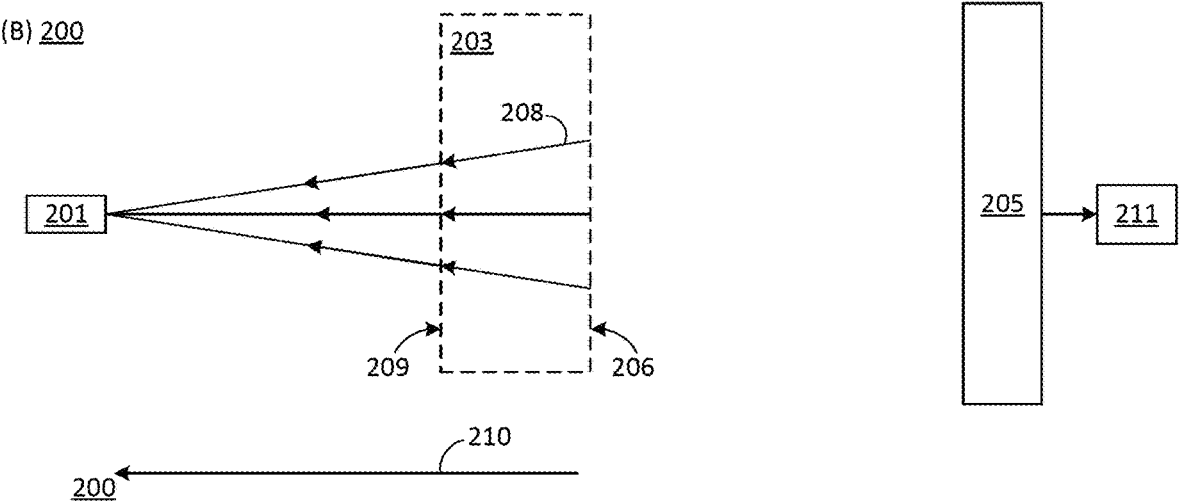
Figure 2:
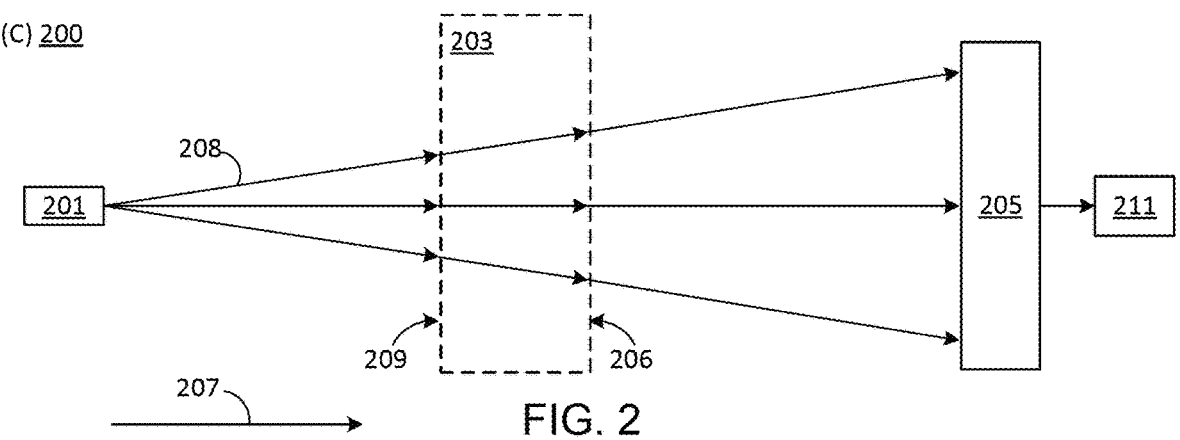
Figure 3:
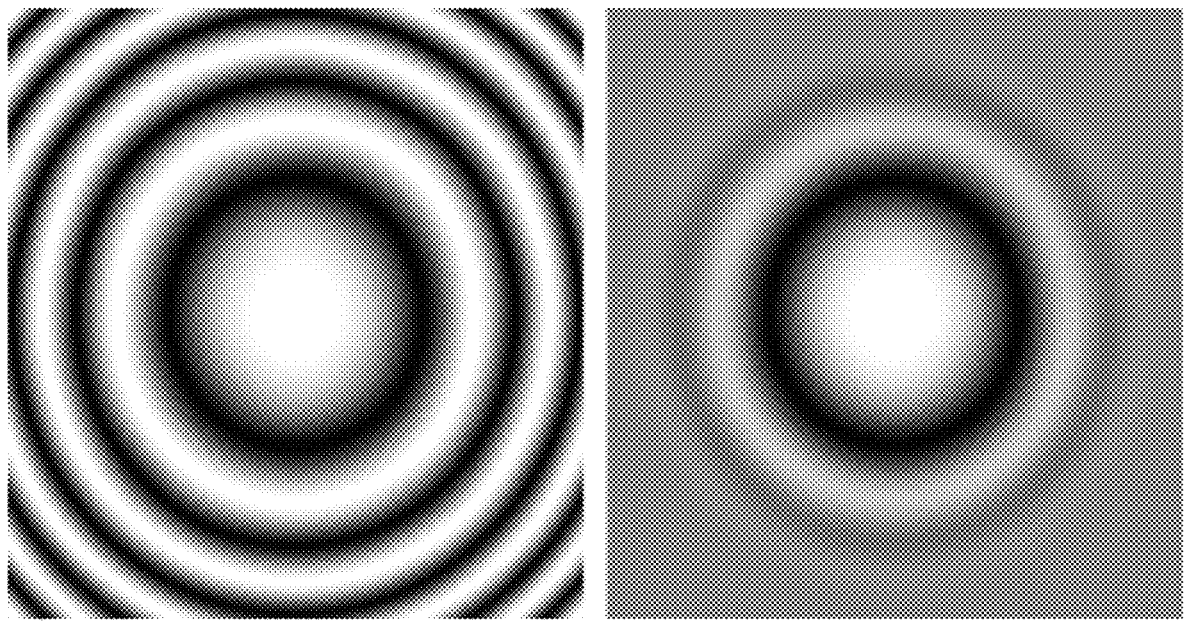
FIG. 3 shows Fresnel diffraction (left) with full coherence and (right) with partial coherence. The fully coherent case is the interference of a point source and a plane wave at 10 keV. The partially coherent case uses the spectral distribution of the source centered on 10 keV with a standard deviation of 2 keV. Both use the experimental geometry, according to some embodiments, according to the Example.
Figure 4:
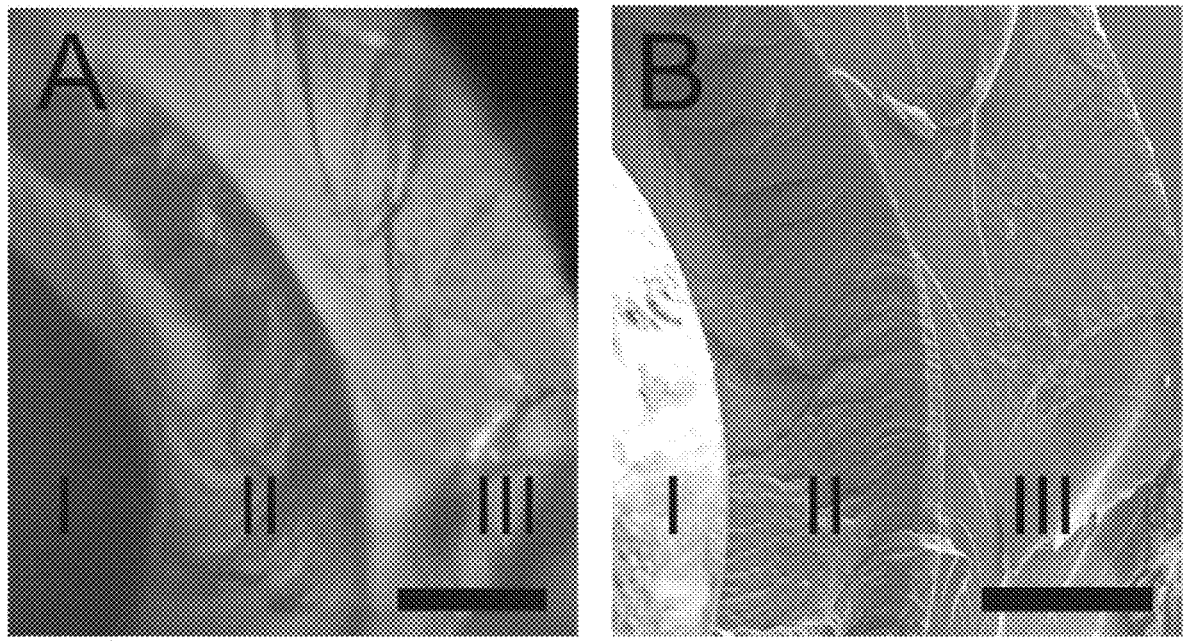
FIG. 4 shows (A) a visible light image and (B) a scanning electron microscope (SEM) image of a cross section of the optical fiber, according to the Example. The regions shown are: (I) Cladding, (II) Inner Coating, and (III) Outer Coating. The scale bars are each 20 μm.
Figure 5:
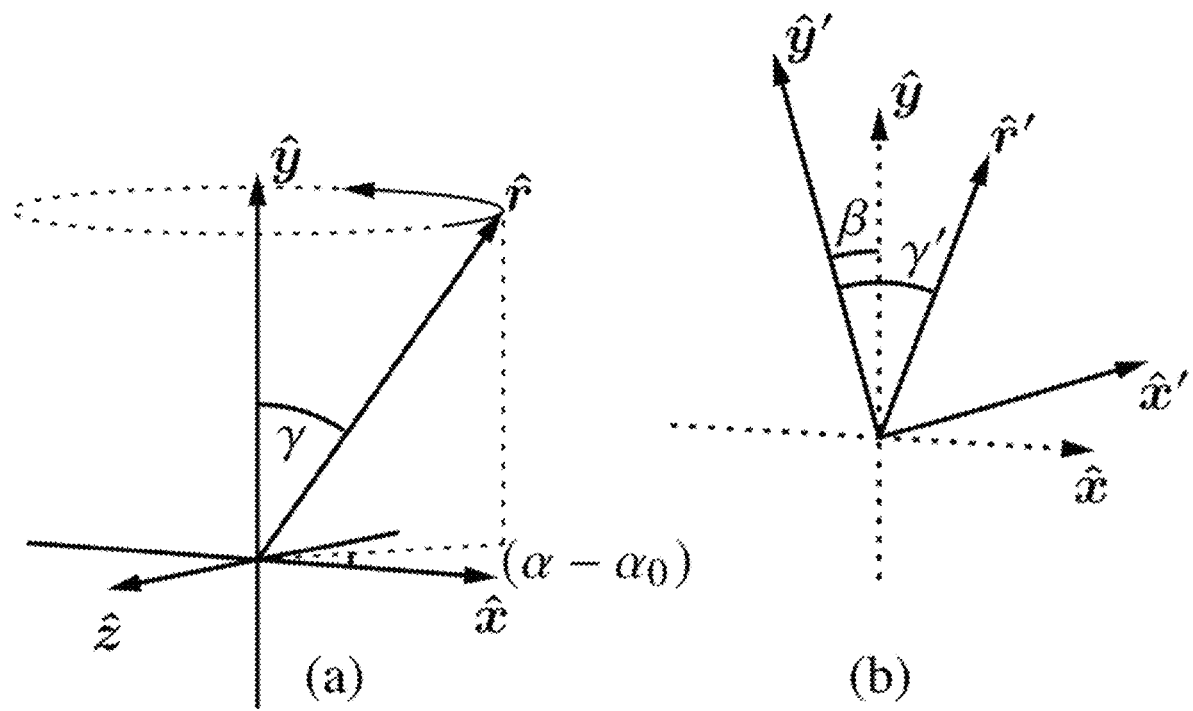
FIG. 5 shows (a) the motion of the optical fiber in the source-detector frame $x^\wedge, y^\wedge, {}^\wedge z$ undergoing rotation, $\alpha$, around the system rotation axis $y^\wedge$ can be described by a vector $r^\wedge$ with a maximum tilt $\gamma$ with respect to the rotational axis, and an initial rotation position with respect to the projection angle of maximum tilt, $\alpha 0$, according to the Example. (b) The detected slope in the projection image is given by the angle between the projected fiber vector $r^\wedge(\alpha)$ and the detector y axis, $y^{\wedge'}$. If the detector frame $x^{\wedge'}, y^{\wedge'}$ is not perfectly aligned with the system frame, the observed projected slope $\gamma'(\alpha)$ has an additional offset $\beta$ and is given by Eq. (30).
Figure 6:
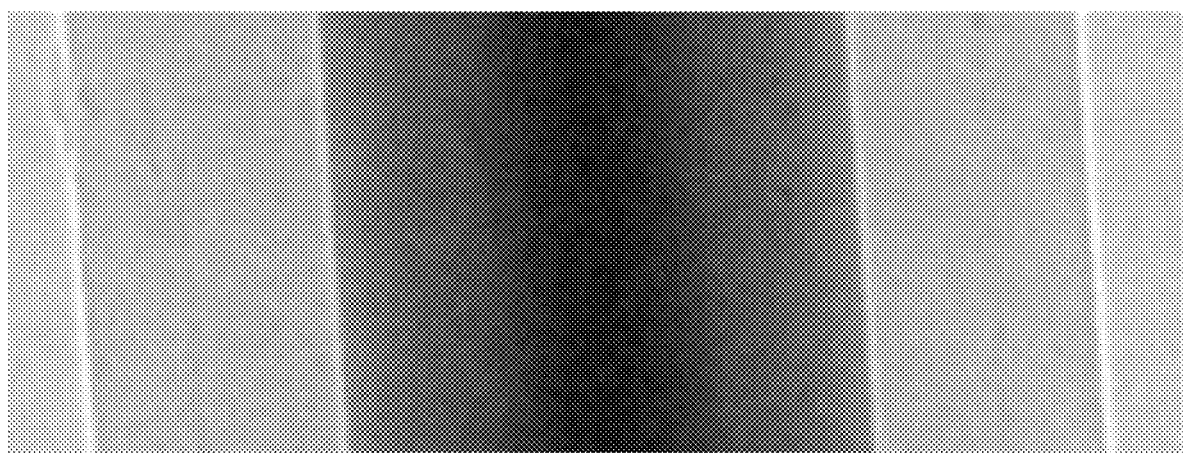
FIG. 6 shows, according to the Example, the image of the optical fiber with the largest angle between the fiber direction and the rotation axis after alignment by Arec3d. The image has an observation angle of 121.275°. The central 100 slices used in the reconstruction are shown.
Figure 7:
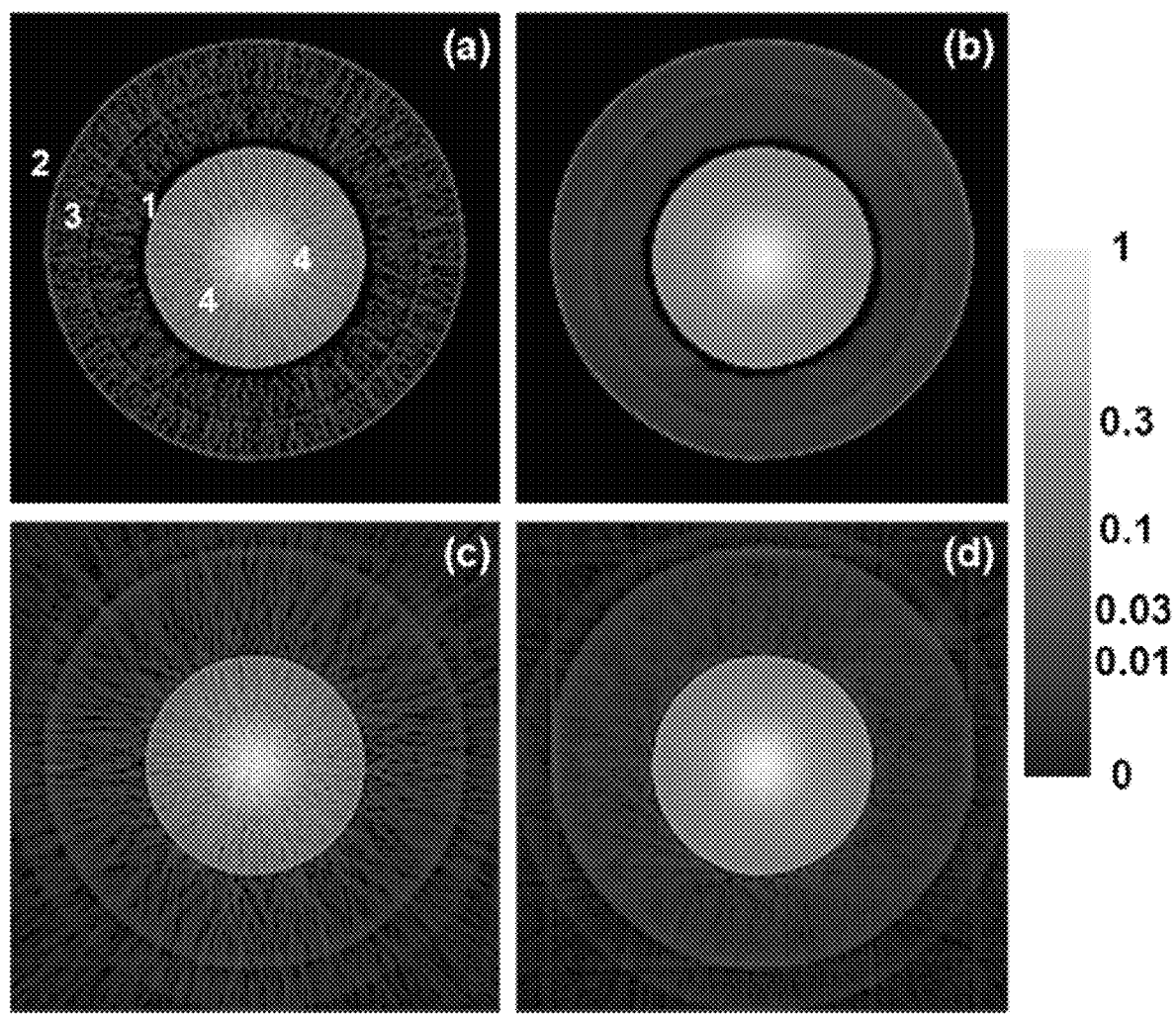
FIG. 7 shows, according to the Example, each image of the graded-index optical fiber is the average of 14 reconstructed slices from the center of the image. The reconstructed values were scaled from 0 to 1 in each panel and then a cube root was applied to emphasize the smaller values. The gray scale (right) applies to each subfigure: (a) maximum likelihood projection (b) Bayesian projection (c) maximum likelihood diffraction, and (d) Bayesian diffraction.
Figure 8:
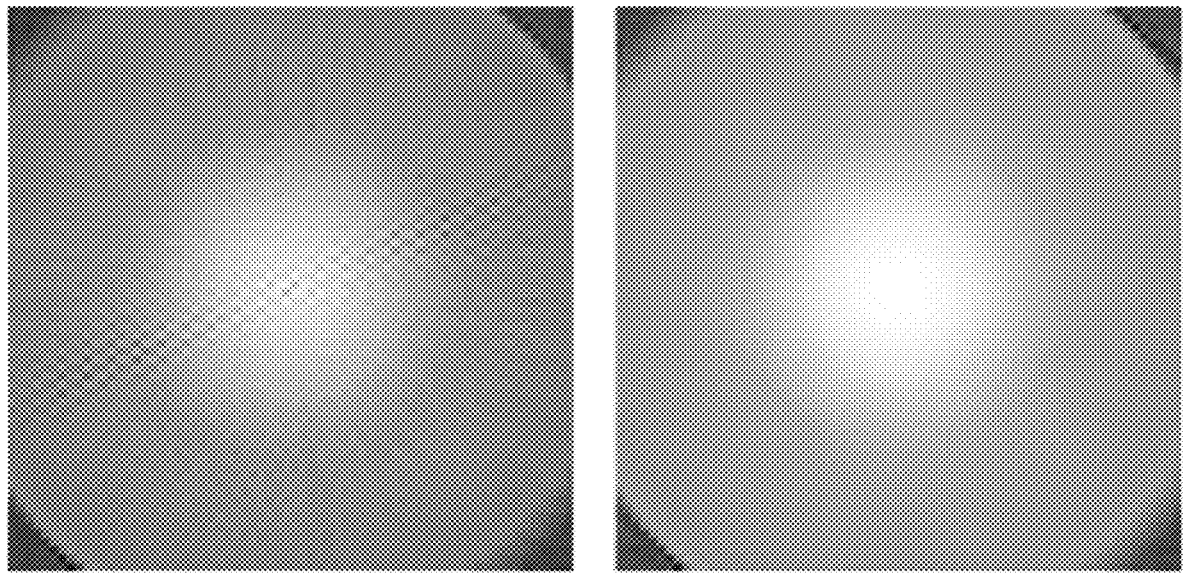
FIG. 8 shows, according to the Example, magnified images show how the Bayesian term eliminates the stipple in the center of the image. (left) Center of Fig. 7(c), maximum likelihood diffraction. (right) Center of Fig. 7(d), Bayesian diffraction.
Figure 9:
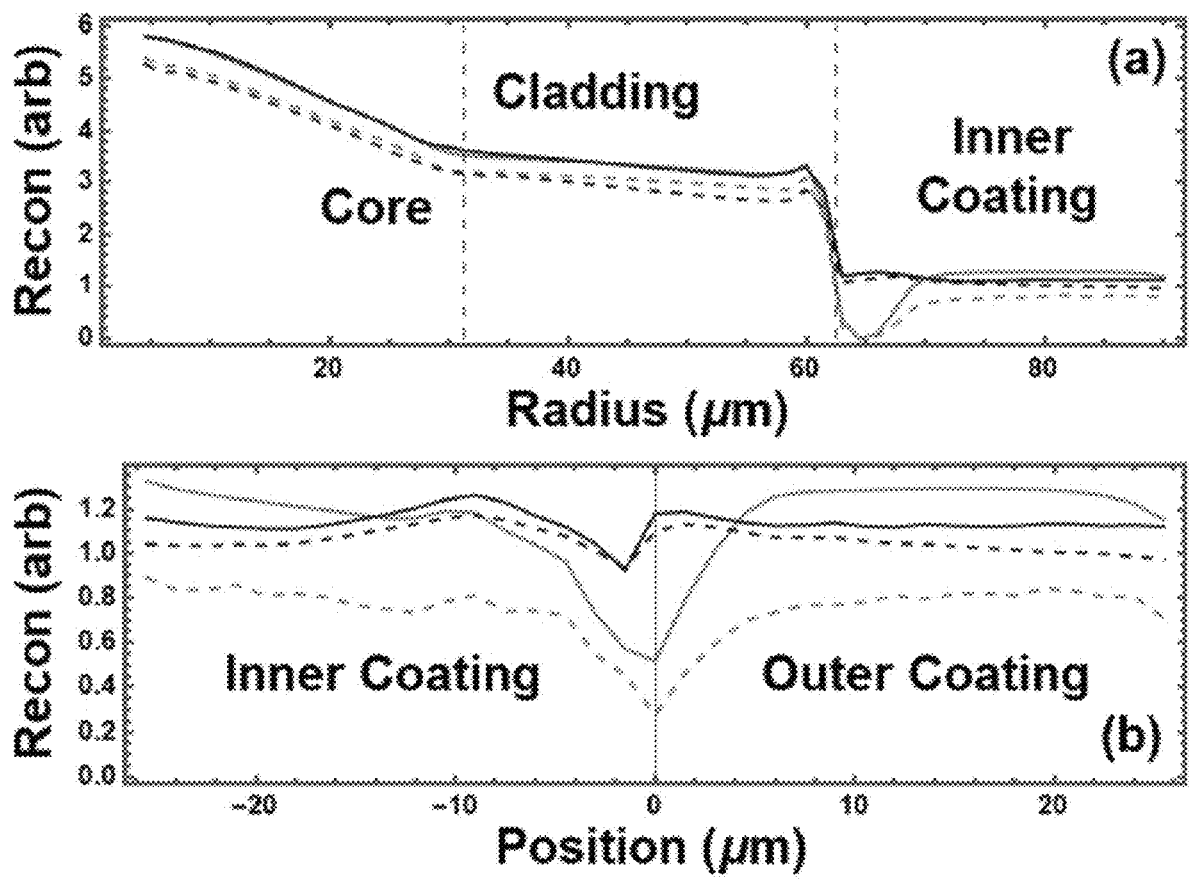
FIG. 9 shows, according to the Example, averages of the reconstructed values over 8 central slices and rings described in the text. The units of the reconstruction are arbitrary, but the same for both subfigures. The green lines refer to projective tomography and the blue lines to diffractive tomography. The dashed lines use the maximum likelihood approximation, whereas the solid lines include a Bayesian prior. (a) Averages are taken centered about the cladding-inner coating boundary. The dashed vertical lines mark the manufacturer's specification for the core-cladding boundary and the cladding-coating boundary. (b) Averages described in the text are taken with the inner-outer coating boundary as defined by the projective, maximum likelihood reconstruction. Positions are relative to that boundary.

Tomographic reconstruction apparatus 200 acquires empirical image 211 and can remove diffraction effects in the tomographic image 211. In an embodiment, with reference to FIG. 1 and FIG. 2, removing diffraction effects in a tomographic image includes: obtaining an empirical image 211 of a sample 203, the empirical image 211 comprising diffraction effects; producing an initial wave 202 at a radiation source 201; forward propagating, in a forward propagation direction 207 from the radiation source 201 toward a detector 205; receiving, at a radiation source proximate surface 209 of the sample 203 that is interposed between the radiation source 201 and the detector 205, the initial wave 202 from the radiation source 201; forward propagating, in the forward propagation direction 207, the initial wave 202 through the sample 203 and accumulating phase 204 and amplitude information of the initial wave 202 as the initial wave 202 propagates through the sample 203 toward the detector 205 to produce a phase accumulated wave 208 at a detector proximate surface 206 of the sample 203 according to $$U(X,Y,Z_f) \approx \exp\{ikZ_f - k\int_{Z_i}^{Z_f} dZ[i\delta_E(X,Y,Z) + \beta_E(X,Y,Z)]\} U(X,Y,Z_i);$$

back propagating, in a reverse propagation direction 210 in absence of the sample 203, the phase accumulated wave 208 from the detector proximate surface 206 to the radiation source 201; and forward propagating, in the forward propagation direction 207 from the radiation source 201 toward the detector 205 in absence of the sample 203, the phase accumulated wave 208 while treating Fresnel diffraction according to $$U(X_b, Y_b, Z_b) =$$
$$\frac{e^{ikZ_{ba}}}{i\lambda Z_{ba}} \int dX_a dY_a \exp\left\{i\frac{k}{2Z_{ba}}\left[(X_b - X_a)^2 + (Y_b - Y_a)^2\right]\right\} \times U(X_a, Y_a, Z_a),$$

such that the empirical image 211 of the sample 203 is reconstructed by projections and diffraction via maximum likelihood, a Bayesian prior probability distribution, and a Fresnel propagator.

In an embodiment, forward propagating, in the forward propagation direction 207, the initial wave 202 through the sample 203 includes determining $f_{Fi}$ from $I_{j\psi}$ according to $$I_{j\psi} = \int dE D(E) I_j^{(0)}(E) \exp\left(-\sum_i \alpha_i(E) \sum_{\vec{r}} f_{\vec{r}i} A_{\vec{r}\psi}\right).$$

In an embodiment, forward propagation, in the forward propagation direction 207, the initial wave 202 through the sample 203 includes minimizing an objective function the difference between the scalar diffraction equation within the Fresnel approximation and the empirical image 211. In an embodiment, the objective function is $$L_{MAP}(\vec{n}|\vec{f}) = L_{ML}(\vec{n}|\vec{f}) + g(\vec{f}).$$

In an Embodiment, the Prior Probability Distribution is $$g(\vec{f}) = \sum_{\langle rr' \rangle} c_{\vec{r}r'} |f_{\vec{r}} - f_{\vec{r}'}|^p.$$

In an embodiment, forward propagation further includes maximizing the objective function; determining the gradient of the objective function according to the equation $$\frac{\partial I_{j\psi}}{\partial f_{\vec{r}i}} = -\int dE D(E) I_j^{(0)}(E) \alpha_i(E) A_{\vec{r}\psi} \exp\left(-\sum_{i',\vec{r}} \alpha_{i'}(E) f_{\vec{r}i'} A_{\vec{r}\psi}\right);$$

and subjecting values of the objective function and the gradient of the objective function to a BFGS algorithm.

In an embodiment, forward propagating, in the forward propagation direction 207 from the radiation source 201 toward the detector 205 in absence of the sample 203, further includes determining the scalar wave according to $$\tilde{U}(X_2, Y_2, Z_2) =$$
$$\frac{1}{\lambda^3 Z_{10}^2 Z_{20}} \int\int dX_0 dY_0 \exp\left\{i\frac{k}{2}\left(\frac{1}{Z_{20}} - \frac{1}{Z_{10}}\right)(X_0^2 + Y_0^2)\right\} \times B(X_0, Y_0)$$
$$\exp\left\{-i\frac{k}{Z_{20}}(X_2 X_0 + Y_2 Y_0)\right\}.$$

In an embodiment, forward propagating, in the forward propagation direction 207 from the radiation source 201 toward the detector 205 in absence of the sample 203, further includes determining the intensity according to $$I(X_2, Y_2, Z_2) = |U(X_2, Y_2, Z_2)|^2 = |\tilde{U}(X_2, Y_2, Z_2)|^2.$$

In an embodiment, a process for removing diffraction effects in a tomographic image includes: determining $b(X_1, Y_1)$ from a plurality of projections and an estimate of the material parameters $\delta$ and $\beta$; applying the Fourier transform to $b(X_1, Y_1)$ to find $B(X_0, Y_0)$; determining $\tilde{U}(X_2, Y_2, Z_2)$ by multiplying $B(X_0, Y_0)$ by a quadratic phasor and prefactors and applying an inverse Fourier transform according to $$\tilde{U}(X_2, Y_2, Z_2) =$$
$$\frac{1}{\lambda^3 Z_{10}^2 Z_{20}} \int\int dX_0 dY_0 \exp\left\{i\frac{k}{2}\left(\frac{1}{Z_{20}} - \frac{1}{Z_{10}}\right)(X_0^2 + Y_0^2)\right\} \times B(X_0, Y_0)$$
$$\exp\left\{-i\frac{k}{Z_{20}}(X_2 X_0 + Y_2 Y_0)\right\}$$

In an embodiment, the process further includes performing the previous steps for each photon energy in a spectrum of energies of radiation that produces the tomographic image. In an embodiment, process further includes looping over viewing angles of the detector 205. In an embodiment, the process further includes, for each of the viewing angles: determining projections of the initial wave 202 through the sample 203; and determining the scalar wave $U_2$ of the initial wave 202 on the detector 205. In an embodiment, the process further includes looping over the projections of the initial wave 202. In an embodiment, the process further includes, for each of the projections: determining $\partial U_1 / \partial P_{\vec{s}_1}$; determining $\partial U_2 / \partial P_{\vec{s}_1}$; determining $\partial I_{\vec{j}\vec{s}_2} / \partial P_{\vec{s}_1 i}$; and determining $\partial L / \partial P_{\vec{s}_1 i}$. In an embodiment, the process further includes multiplying $\partial L / \partial P_{\vec{s}_1 i}$ by the system matrix and accumulating terms in a gradient along a projection.

In an embodiment, determining the scalar wave $U_2$ of the initial wave 202 on the detector 205 occurs according to $$U_2(\vec{s}_2, E, v) = \sum_{\vec{s}_1} G(\vec{s}_2, \vec{s}_1, E) U_1(\vec{s}_1, E, v).$$

In an embodiment, the radiation source 201 produces the initial wave 202 such that the initial wave 202 is partially coherent.

In an embodiment, the radiation source 201 is an x-ray tube although other sources such as electron sources can be used.

The process for removing diffraction effects in a tomographic image is illustrated further by the following Example, which is non-limiting.

EXAMPLE

A reconstruction algorithm for partially coherent x-ray computed tomography (XCT) including Fresnel diffraction is developed and applied to an optical fiber. The algorithm is applicable to a high-resolution tube-based laboratory-scale x-ray tomography instrument. The computing time is only a few times longer than the projective counterpart. The algorithm is used to reconstruct, with projections and diffraction, a tilt series acquired at the micrometer scale of a graded-index optical fiber using maximum likelihood and a Bayesian method. The inclusion of Fresnel diffraction removes some reconstruction artifacts and use of a Bayesian prior probability distribution removes others, resulting in a substantially more accurate reconstruction.

Diffraction can be described by scalar wave theory as well as by classical electromagnetism. Polarization effects in non-magnetic materials are important when the wavelength is comparable to the feature size. Although herein considers non-magnetic systems, vector x-ray nanotomography has been used to image magnetic systems on the micrometer scale where polarization dependence is important. Here, the x-ray wavelength, typically 100 pm, is small compared to the minimum feature size, which is near 1 μm. Hence, scalar diffraction theory is sufficient. Moreover, considered is the case where the width of the detector is small compared to the effective sample-detector distance, so the Fresnel propagator can be used.

Projective Tomography.

Code can perform projective tomography using a multi-spectral source. The process herein builds on projective tomography as presented herein. The multi-spectral, multi-material notation is incorporated into the code. In the context of tomography, the use of two spectra is often called "dual energy." In the application in this paper, a single spectrum and single basis material are used although physically more than one material can be present in the sample. Materials in the sample such as acrylic and silica are differentiated by a single real number denoting the density of the basis material in a given voxel.

The intensity $I_{j\psi}$ is observed for each source spectrum j and viewing condition $\psi$ is given by $$I_{j\psi} = dED(E)I_j^{(0)}(E)\exp\int\left(-\sum_i \alpha_i(E)\sum_{\vec{r}} f_{\vec{r}i} A_{\vec{r}\psi}\right) \quad (1)$$

where $f_{\vec{r}i}$ is the concentration of basis material i at voxel $\vec{r}$, D(E) is the detection efficiency at photon energy E, and $A_{\vec{r}\psi}$ is the system matrix which consists of the lengths of line segments travelling through voxel i for viewing condition (p. The viewing condition $\psi$ is a joint set of viewing angles and projections. There is one projection per detector pixel. Continuing, $I_j^{(0)}$ (E) is a source spectrum and j is the spectrum index. The interaction of material i and the beam is represented by an absorption coefficient $\alpha_i$(E). The process of "reconstruction" is the determination of the $f_{\vec{r}i}$ for each voxel at $\vec{r}$ and each basis material i. In Eq. (1), all indices are given explicitly. The voxel size will be large compared to a wavelength but small compared to the system dimensions. All other variables are treated as known, either because they are measured, are parameters from the experiment, or, in the case of the spectrum given by an assumed model. The absorption coefficients are tabulated by several sources, and used are those of the Center for X-ray Optics (CXRO) that also offers the complex index of refraction, which is used for Fresnel diffraction.

The Projection Integral $$P_{\vec{r}\psi} = \sum_{\vec{r}} f_{\vec{r}i} A_{\vec{r}\psi} \quad (2)$$

appears in Eq. (1). If there are N×N×N voxels in the reconstruction, then $A_{\vec{r}\psi}$ can have no more than 3N non-zero values for a given $\psi$. In principle, the dimensions of A are $N^3$ by the product of the number of detector pixels times the number of viewing angles. The number of detector pixels is expected to be $O(N^2)$, and the number of viewing angles is expected to be $O(N)$. For example, for Nyquist-limited sampling in 2D projection tomography, the number of viewing angles should be $\pi/2N$ or greater. Hence A has $O(N^6)$ elements of which $O(N^4)$ are non-zero. This matrix is too large to store, so it is computed as needed.

The best solution is obtained by minimizing an objective function which considers both the differences of the predictions of Eq. (1) from the observations as well as prior information about the reconstruction. Specifically, the function is $$L_{MAP}(\vec{n}|\vec{f}) = L_{ML}(\vec{n}|\vec{f}) + g(\vec{f}), \quad (3)$$

where $\vec{n}$ has elements $n_J$, which are the counts observed at the joint index of observation J=(j$\psi$), $\vec{f}$ is the proposed reconstruction whose components are the $f_{\vec{r}i}$ introduced above, and $g(\vec{f})$ is the prior distribution. The first term in the log-likelihood function is derived assuming that each observation $n_J$ obeys the Poisson distribution with mean $I_J$:

$$L_{ML}(\vec{n}|\vec{f}) = \sum_J \left[\ln n_J! - n_J\ln I_J(\vec{f}) + I_J(\vec{f})\right]. \quad (4)$$

Minimizing $L_{MAP}$ gives the maximum a posteriori (MAP) estimate whereas minimizing the negative of the log likelihood $L_{ML}$ alone is the Maximum Likelihood (ML) method. The prior probability distribution is $$g(\vec{f}) = \sum_{\langle\vec{r}\vec{r}'\rangle} c_{\vec{r}\vec{r}'} |f_{\vec{r}} - f_{\vec{r}'}|^p \quad (5)$$

where the sum is taken over neighboring pairs. The process specializes to isotropic cubic voxels where the neighboring pairs include six faces with $c_{\vec{r}\vec{r}'}=1$, twelve edges with $c_{\vec{r}\vec{r}'}=1/\sqrt{2}$, and eight vertices with $c_{\vec{r}\vec{r}'}=1/\sqrt{3}$.

For the case of $1<p\leq 2$, one can use p=1.1 for the material inspection problem, corresponding to distinct levels with abrupt edges. The optical fiber conforms to this with the exception of the graded index in the core. Herein is adopted p=1.1. The prior distribution is restricted to the case of a single basis material. An appropriate prior distribution for the multi-material case is a research topic.

The objective function is maximized by initializing the h with random numbers and applying the L-BFGS-B code of Ref. (hereafter BFGS). The BFGS algorithm uses values of the function and its gradient. It is possible to find these together with considerable reuse of intermediate results. Optimization using the BFGS algorithm requires the calculation of the gradient of the objective function:

$$\frac{\partial I_{j\psi}}{\partial f_{\vec{r}i}} = -dED(E)I_j^{(0)}(E)\alpha_i(E) A_{\vec{r}\psi}\exp\int\left(-\sum_{i'\vec{r}} \alpha_{i'}(E)f_{\vec{r}'i'} A_{\vec{r}'\psi}\right) \quad (6)$$

A constraint is that each material in each voxel is non-negative, i.e., $f_{\vec{r},i} \geq 0$. The BFGS algorithm is used with a 128 dimensional subspace, a value which was near optimal in a study with the program on a different example. This FIGURE is more than the range of 3 to 20 recommended by Ref.

If the Bayesian term $g(\vec{f})$ is included, proceed in two stages: first, the ML solution is found, then it is used as a starting point for the Bayesian reconstruction.

Tomography with the Fresnel Propagator.

Following Paganin, treat Fresnel diffraction as follows: accumulate changes in both phase and amplitude on projections through the sample. Neglect diffraction within the sample itself but include it when considering propagation from the sample to the detector. The equation is $$U(X,Y,Z_f) \approx \exp\{ikZ_{fi} - k\int_{Z_i}^{Z_f} dZ[i\beta_E(X,Y,Z) + \beta_E(X,Y,Z)]\} U(X,Y,Z_i) \quad (7)$$

Here, X, Y, and Z are coordinates in the source-detector frame, U is the complex-valued scalar wave, $Z_i$ and $Z_f$ are two planes surrounding the sample, $Z_{fi} = Z_f - Z_i$, and $\delta$ and $\beta$ are related to the complex index of refraction of the material by $$n_E = 1 - \delta_E + i\beta_E. \quad (8)$$

The wavevector $$k = \frac{2\pi}{\lambda},$$

is related to the photon energy by $E = \hbar ck$ where $\hbar$ is the reduced Planck constant and c is the speed of light. Below, tabulated values of the complex index of refraction for silica is 2.2 g/cm³. The distinction between the index of refraction n(E) and the observations $n_J$ should be clear from context.

Fresnel Propagator.

Assume that there is a point source for the x rays and neglect the finite extent of the source. Straightforward application of the Fresnel propagator (i.e., from the sample plane to the detector plane) is challenging numerically because of the need to treat the outgoing spherical wave, which has rapid oscillations far off-axis, particularly at large propagation distances. The spherical wave is an analytic function with the sample imposing a slowly-varying multiplicative modification in phase and amplitude given by Eq. (7). The sampling requirements are the same as that of projective tomography. Implement the forward model with three steps: (1) propagating a point source to the sample plane and modulate it using the sample transmission function; (2) back propagate the scalar wave to the source plane; and (3) propagate the scalar wave to the detector plane. The propagation steps are done through free space (i.e., without the sample) after the phase of the scalar wave in the sample plane has been determined by the projection integrals of Eq. (7). The method is equivalent to the application of the Fourier magnification theorem. However, the instant implementation does not invoke the theorem explicitly or make use of transformed variables.

The Fresnel propagator that takes the scalar amplitude from a plane $Z=Z_a$ to a plane $Z=Z_b$ is given by $$U(X_b, Y_b, Z_b) = \frac{e^{ikZ_{ba}}}{i\lambda Z_{ba}} \quad (9)$$

$$\int\int dX_a \, dY_a \, \exp\left\{i\frac{k}{2Z_{ba}}[(X_b - X_a)^2 + (Y_b - Y_a)^2]\right\} \times U(X_a, Y_a, Z_a),$$

where $(X_a, Y_a)$ are Cartesian coordinates in the $Z=Z_a$ plane with a similar relation for $(X_b, Y_b)$, $Z_{ba} = Z_b - Z_a$, and the domain of integration is the whole $Z=Z_a$ plane. U is energy-dependent, but the variable E is suppressed to keep the formulas readable.

The diffraction calculation proceeds with these planes: $Z=Z_0$ the plane including the point source, $Z=Z_1$ the midpoint of the sample, and $Z=Z_2$ the detector plane. Since the outgoing spherical wave is locally a plane wave, the direction for the projection is the radial direction away from the source. The initial and final points in Eq. (7), $Z_i$ and $Z_f$, are near $Z=Z_1$. In the Fresnel propagation portion of the calculation, the projected phase is assigned to the $Z=Z_1$ plane.

Starting from a point source of unit integrated strength, taken to be at $(X_0=0, Y_0=0, Z_0)$, the scalar wave on the $Z=Z_1$ plane, without considering the effect of the sample, is $$U^{(0)}(X_1, Y_1, Z_1) = \frac{e^{ikZ_{10}}}{i\lambda Z_{10}} \exp\left\{i\frac{k}{2Z_{10}}(X_1^2 + Y_1^2)\right\}. \quad (10)$$

The effect of the sample treated in the projection approximation is to introduce a phasor via $$U(X_1, Y_1, Z_1) = b(X_1, Y_1) U^{(0)}(X_1, Y_1, Z_1) \quad (11)$$

with $$b(X,Y) = \exp\{-\int_{Z_i}^{Z_f} dZ[ik\delta_E(X,Y,Z) + k\beta_E(X,Y,Z)]\} \quad (12)$$

The projection integral of Eq. (12) is similar to the one found in Eq. (1), although one is an integral over the complex index of refraction and the other is an integral over the real absorption coefficient. Physically, this approximation is arrived at by compressing the sample into a small strip while preserving the projected mass. In this implementation, neglect the small difference between projections parallel to the Z axis and those directed away from the source. Like U, b is energy dependent.

Equation (10) is not easily computed numerically because of the quadratic phase factor. However, propagating back through free space to the plane of the origin, the scalar wave is $$U(X_0, Y_0, Z_0) = \frac{e^{ikZ_{01}}}{i\lambda Z_{01}} \int\int dX_1 dY_1 \quad (13)$$

$$\exp\left\{i\frac{k}{2Z_{01}}[(X_0 - X_1)^2 + (Y_0 - Y_1)^2]\right\} U(X_1, Y_1, Z_1)$$

$$= \frac{1}{\lambda^2 Z_{10}^2} \exp\left\{-i\frac{k}{2Z_{10}}(X_0^2 + Y_0^2)\right\} \times$$

$$\int\int dX_1 \, dY_1 \, b(X_1, Y_1) \exp\left\{i\frac{k}{Z_{10}}(X_0 X_1 + Y_0 Y_1)\right\}.$$

In going from line 1 to line 2 in Eq. (13), the quadratic phase factor in $(X_1, Y_1)$ cancels. The bandwidth of $b(X_1, Y_1)$ is comparable to functions that arise in projection tomography For the wave on the detector, propagate forward from the source plane $Z=Z_0$ to the detector plane $Z=Z_2$ resulting in $$U(X_2, Y_2, Z_2) = \quad (14)$$

$$\frac{1}{\lambda^2 Z_{10}^2} \frac{1}{i\lambda Z_{10}} \exp\left\{ikZ_{20} + i\frac{k}{2Z_{20}}(X_2^2 + Y_2^2)\right\} \times \int\int dX_0 dY_0 \exp$$

$$\left\{i\frac{k}{2}\left(\frac{1}{Z_{20}} - \frac{1}{Z_{10}}\right)(X_0^2 + Y_0^2)\right\} \times B(X_0, Y_0) \exp\left\{-i\frac{k}{Z_{20}}(X_2 X_0 + Y_2 Y_0)\right\}$$

where $$B(X_0, Y_0) = \int\int dX_1 dY_1 b(X_1, Y_1) \exp\left\{i\frac{k}{Z_{10}}(X_0 X_1 + Y_0 Y_1)\right\}. \quad (15)$$

Equation (14) describes free space propagation performed as if the sample is not present. Physically, the sample is already accounted through $b(X_1, Y_1)$. Computationally, the scalar wave is determined $$\tilde{U}(X_2, Y_2, Z_2) = \quad (16)$$

$$\frac{1}{\lambda^3 Z_{10}^2 Z_{20}} \int\int dX_0 dY_0 \exp\left\{i\frac{k}{2}\left(\frac{1}{Z_{20}} - \frac{1}{Z_{10}}\right)(X_0^2 + Y_0^2)\right\} \times$$

$$B(X_0, Y_0) \exp\left\{-i\frac{k}{Z_{20}}(X_2 X_0 + Y_2 Y_0)\right\}$$

and then find the intensity by squaring the amplitude, i.e., $$I(X_2,Y_2,Z_2) = |U(X_2,Y_2,Z_2)|^2 = |\tilde{U}(X_2,Y_2,Z_2)|^2. \quad (17)$$

Legible Text for Pages 20 and 21

The change in log-likelihood L with respect to a change in a voxel value is given by Eqs. (3) and (6). The observed intensities $I_J$ are jointly indexed by J, which was previously decomposed into a spectrum index j and a joint viewing-angle and detector pixel variable $\psi$. Here, further decompose $\psi = (\vec{s}_2, v)$ where $\vec{s}_2$ is a detector pixel and v is a viewing angle. For the Fresnel case, $$I_{j\vec{s}_2 v} = \sum_E I_{jE}^{(0)} |U_s(\vec{s}_2, E, v)|^2 \quad (18)$$

This equation is similar to Eq. (1) in the projective case. In turn $$U_2(\vec{s}_2, E, v) = \sum_{\vec{s}_1} G(\vec{s}_2, \vec{s}_1, E) U_1(\vec{s}_1, E, v). \quad (19)$$

Here, $U_2$ and $U_1$ are the scalar waves on the detector and sample planes, respectively, and G is the Fresnel propagator, a Green's function. The scalar wave function is given by $$U_1(\vec{s}_1, E, v) = \exp\left\{\sum_i \tilde{\alpha}_i(E) P_{\vec{s}_1 v i}\right\} U_1^{(0)}(\vec{s}_1, E, v) \quad (20)$$

where $P_{\vec{s}_1 v i}$ is a projection and $U_1^{(0)}(\vec{s}_1, E, v)$ is the scalar wave at the sample plane if the sample were absent and $$\tilde{\alpha}_i(E) = -k[\beta_i(E) + i\delta_i(E)]. \quad (21)$$

The projection is given by Eq. (2), with the complex $\tilde{a}_i(E)$ being analogous to the real $\tilde{a}_i(E)$.

BFGS requires the derivatives of Eq. (3), which in turn requires the derivatives of Eq. (18).

$$\frac{\partial I_{j\vec{s}_2 v}}{\partial f_{\vec{r}i}} = \sum_E I_{jE}^{(0)} \frac{\partial}{\partial f_{\vec{r}i}} |U_2(\vec{s}_2, E, v)|^2 \quad (22)$$

$$= 2\sum_E I_{jE}^{(0)} \text{Re}\left[U_2^*(\vec{s}_2, E, v)\frac{\partial}{\partial f_{\vec{r}i}} U_2(\vec{s}_2, E, v)\right].$$

Equation (22) Requires the Following Expression $$\frac{\partial}{\partial f_{\vec{r}i}} U_2(\vec{s}_2, E, v) = \sum_{\vec{s}_1} G(\vec{s}_2, \vec{s}_1, E) \frac{\partial}{\partial f_{\vec{r}i}} U_1(\vec{s}_1, E, v) \quad (23)$$

Equation (23) Requires the Derivative of Eq. (20) Namely $$\frac{\partial}{\partial f_{\vec{r}i}} U_1(\vec{s}_2, E, v) = \left[\tilde{\alpha}_i(E) \frac{\partial P_{\vec{s}_1 v i}}{\partial f_{\vec{r}i}}\right] \exp\left\{\sum_i \tilde{\alpha}_i(E) P_{\vec{s}_1 v i}\right\} \quad (24)$$

$$U_1^{(0)}(\vec{s}_1, E, v)$$

$$= \tilde{\alpha}_i(E) A_{\vec{r}\vec{s}_1 v} U_1(\vec{s}_1, E, v)$$

using Eq. (2), the definition of the projection, in the final line. These equations need to be reconsidered for efficiency. Equations (3) and (6) can be recast as $$\frac{\partial L_{ML}}{\partial f_{\vec{r}i}} = \frac{\partial L_{ML}}{\partial p_{\vec{s}_1 v i}} A_{\vec{r}_1 v} \quad (25)$$

Equation (25) implies a large computational savings since there are O(N) more instances of $$\frac{\partial L_{ML}}{\partial f_{\vec{r}i}}$$

than $$\frac{\partial P_{\vec{s}_1 v i}}{\partial f_{\vec{r}i}}$$

and $A_{\vec{r}s_1 v}$ is very easy to compute.

In the case of partial coherence, approximate $G(\vec{s}_2, \vec{s}_1, E)$ by a short-range function, anticipating a cancellation at long range after the average over energies. An analytic example of such cancellation is given in the next section. Refer to the region of $G(\vec{s}_2, \vec{s}_1, E)$, which is represented numerically as the "non-negligible region."

The organization of the Fresnel gradient is similar to the projective case. Instead of looping over the detector pixels $\vec{s}_2$, loop over a set of virtual pixels on the sample denoted by $\vec{s}_1$. In practice the points $\vec{s}_1$ and $\vec{s}_2$ will be in 1:1 correspondence, i.e., use one projection per detector pixel. Use the fast Fourier transforms of FFTW to implement the Fresnel propagator. The gradient calculation, simplified for one energy E, one material i, and one view v, proceeds as follows:
Loop on angles {
   Find projections through sample
   Use Fresnel propagator to find $U_2$
   Loop on projections {

Legible Text for Page 23
essentially the interference pattern of a point source in the sample and the rest of the wave.

Suppose there is a single voxel that differs from the vacuum value by a differential amount. Calculate the change in the diffraction pattern to first order. Also, suppose that there is a multi-wavelength point source located at the origin; the source plane is $z_0=0$. The voxel is located at $(x_1, y_1, z_1)$. The detector plane is located in the plane $z=z_2$. The unscattered wave is denoted by U and the scattered wave by $U^{(1)}$ and is given by $$U^{(1)}(x_2, y_2, z_2; x_1, y_1, z_1) = \frac{U_0 U_1}{z_1 z_{21}} \exp\left[i\frac{k}{2z_1}(x_1^2 + y_1^2)\right] \times \exp\left\{i\frac{k}{2z_{21}}[(x_2 - x_1)^2 + (y_2 - y_1)^2]\right\} \quad (26)$$

which may be found by considering Eq. (9) with a point source.

The first-order interference pattern on the plane $z=z_2$ for a particular wavevector k is given by $$I(k, x_2, y_2; x_1, y_1) = 2\mathrm{Re}U^*(x_2, y_2, z_2)U^{(1)}(x_2, y_2, z_2; x_1, y_1, z_1) \quad (27)$$

$$C_1 \mathrm{Re} U_1 \times$$

$$= \exp\left\{i\frac{k}{2}\left[\frac{(x_2-x_1)^2+(y_2-y_1)^2}{z_2-z_1} - \frac{x_2^2+y_2^2}{z_2} + \frac{x_1^2+y_1^2}{z_1}\right]\right\},$$

which is a first order expansion of Eq. (17). Next, assume the source intensity is normally distributed in k, hence also normally distributed in the photon energy. One wants to find $$I(x_2, y_2; x_1, y_1) = \int_{-\infty}^{\infty} dk I(k, x_2, y_2; x_1, y_1) \quad (28)$$

$$= \frac{C_1}{\sqrt{2\pi}\sigma_k} \mathrm{Re} U_1 \int_{-\infty}^{\infty} dk \exp\left[-\frac{(k-k_0)^2}{2\sigma_k^2} + ik\xi\right]$$

$$= C_1 \exp\left(-\frac{\sigma_k^2 \xi^2}{2}\right) \mathrm{Re} U_1 \exp(ik_0\xi)$$

Written Request Pursuant to 37 CFR 1.136(a)(3)

The United States Patent and Trademark Office is authorized to treat any concurrent or future reply that requires a petition for extension of time for its time submission as though the reply incorporates a petition for extension of time for the appropriate length of time.

What is claimed is:

1. A process for removing diffraction effects in a tomographic image, the process comprising:
   obtaining an empirical image of a sample, the empirical image comprising diffraction effects;
   producing an initial wave at a radiation source;
   forward propagating, in a forward propagation direction from the radiation source toward a detector;
   receiving, at a radiation source proximate surface of the sample that is interposed between the radiation source and the detector, the initial wave from the radiation source;
   forward propagating, in the forward propagation direction, the initial wave through the sample and accumulating phase and amplitude information of the initial wave as the initial wave propagates through the sample toward the detector to produce a phase accumulated wave at a detector proximate surface of the sample according to $$U(X,Y,Z_f) \approx \exp\{ikZ_f - k\int_{Z_i}^{Z_f} dZ[i\delta_E(X,Y,Z) + \beta_E(X,Y,Z)]\}U(X,Y,Z_i)$$

back propagating, in a reverse propagation direction in absence of the sample, the phase accumulated wave from the detector proximate surface to the radiation source; and
   forward propagating, in the forward propagation direction from the radiation source toward the detector in absence of the sample, the phase accumulated wave while treating Fresnel diffraction according to $$U(X_b, Y_b, Z_b) = \frac{e^{ikZ_{ba}}}{i\lambda Z_{ba}} \int dX_a dY_a \exp\left\{i\frac{k}{2Z_{ba}}[(X_b - X_a)^2 + (Y_b - Y_a)^2]\right\} \times U(X_a, Y_a, Z_a),$$

such that the empirical image of the sample is reconstructed by projections and diffraction via maximum likelihood, a Bayesian prior probability distribution, and a Fresnel propagator.

2. The process of claim 1, wherein forward propagating, in the forward propagation direction, the initial wave through the sample comprises determining $f_{\vec{r}_i}$ from $I_{j\psi}$ according to the equation $$I_{j\psi} = \int dE D(E) I_j^{(0)}(E) \exp\left(-\sum_i \alpha_i(E) \sum_{\vec{r}} f_{\vec{r}_i} A_{\vec{r}\psi}\right).$$

3. The process of claim 2, wherein forward propagation, in the forward propagation direction, the initial wave through the sample further comprises minimizing an objective function the difference between the scalar diffraction equation within the Fresnel approximation and the empirical image.

4. The process of claim 3, wherein the objective function is $$L_{MAP}(\vec{n}|\vec{f}) = L_{ML}(\vec{n}|\vec{f}) + g(\vec{f}).$$

5. The process of claim 4, wherein the prior probability distribution is $$g(\vec{f}) = \sum_{\langle \vec{r}\vec{r}' \rangle} c_{\vec{r}\vec{r}'} |f_{\vec{r}} - f_{\vec{r}'}|^p.$$

6. The process of claim 5, wherein forward propagation further comprises maximizing the objective function; determining the gradient of the objective function according to the equation $$\frac{\partial I_{j\psi}}{\partial f_{\vec{r}i}} = -\int dED(E)I_j^{(0)}(E)\alpha_i(E)A_{\vec{r}\psi}\exp\left(-\sum_{i'\vec{r}}\alpha_{i'}(E)f_{\vec{r}i'}A_{\vec{r}\psi}\right)$$

and subjecting values of the objective function and the gradient of the objective function to a BFGS algorithm.

7. The process of claim 6, wherein forward propagating, in the forward propagation direction from the radiation source toward the detector in absence of the sample, further comprises determining the scalar wave according to $$\tilde{U}(X_2, Y_2, Z_2) =$$
$$\frac{1}{\lambda^3 Z_{10}^2 Z_{20}} \int\int dX_0 dY_0 \exp\left\{i\frac{k}{2}\left(\frac{1}{Z_{20}} - \frac{1}{Z_{10}}\right)(X_0^2 + Y_0^2)\right\} \times B(X_0, Y_0)$$
$$\exp\left\{-i\frac{k}{Z_{20}}(X_2 X_0 + Y_2 Y_0)\right\}.$$

8. The process of claim 7, wherein forward propagating, in the forward propagation direction from the radiation source toward the detector in absence of the sample, further comprises determining the intensity according to $$I(X_2,Y_2,Z_2)=|U(X_2,Y_2,Z_2)|^2=|\tilde{U}(X_2,Y_2,Z_2)|^2.$$

9. The process of claim 1, further comprising looping over viewing angles of the detector.

10. The process of claim 9, further comprising, for each of the viewing angles:
determining projections of the initial wave through the sample; and determining the scalar wave $U_2$ of the initial wave on the detector.

11. The process of claim 10, further comprising looping over the projections of the initial wave.

12. The process of claim 11, further comprising, for each of the projections:
determining $\partial U_1/\partial P_{\vec{s}_1 i}$;
determining $\partial U_2/\partial P_{\vec{s}_1 i}$;
determining $\partial I_{j\vec{s}_2 v}/\partial P_{\vec{s}_1 i}$; and
determining $\partial L/\partial P_{\vec{s}_1 i}$.

13. The process of claim 12, further comprising multiplying $\partial L/\partial P_{\vec{s}_1 i}$ by the system matrix and accumulating terms in a gradient along a projection.

14. The process of claim 9, wherein determining the scalar wave $U_2$ of the initial wave on the detector occurs according to $$U_2(\vec{s}_2, E, v) = \sum_{\vec{s}_1} G(\vec{s}_2, \vec{s}_1, E)U_1(\vec{s}_1, E, v).$$

15. The process of claim 1, wherein the radiation source produces the initial wave such that the initial wave is partially coherent.

16. The process of claim 1, wherein the radiation source comprises an x ray tube.

* * * * *